Patented June 1, 1937

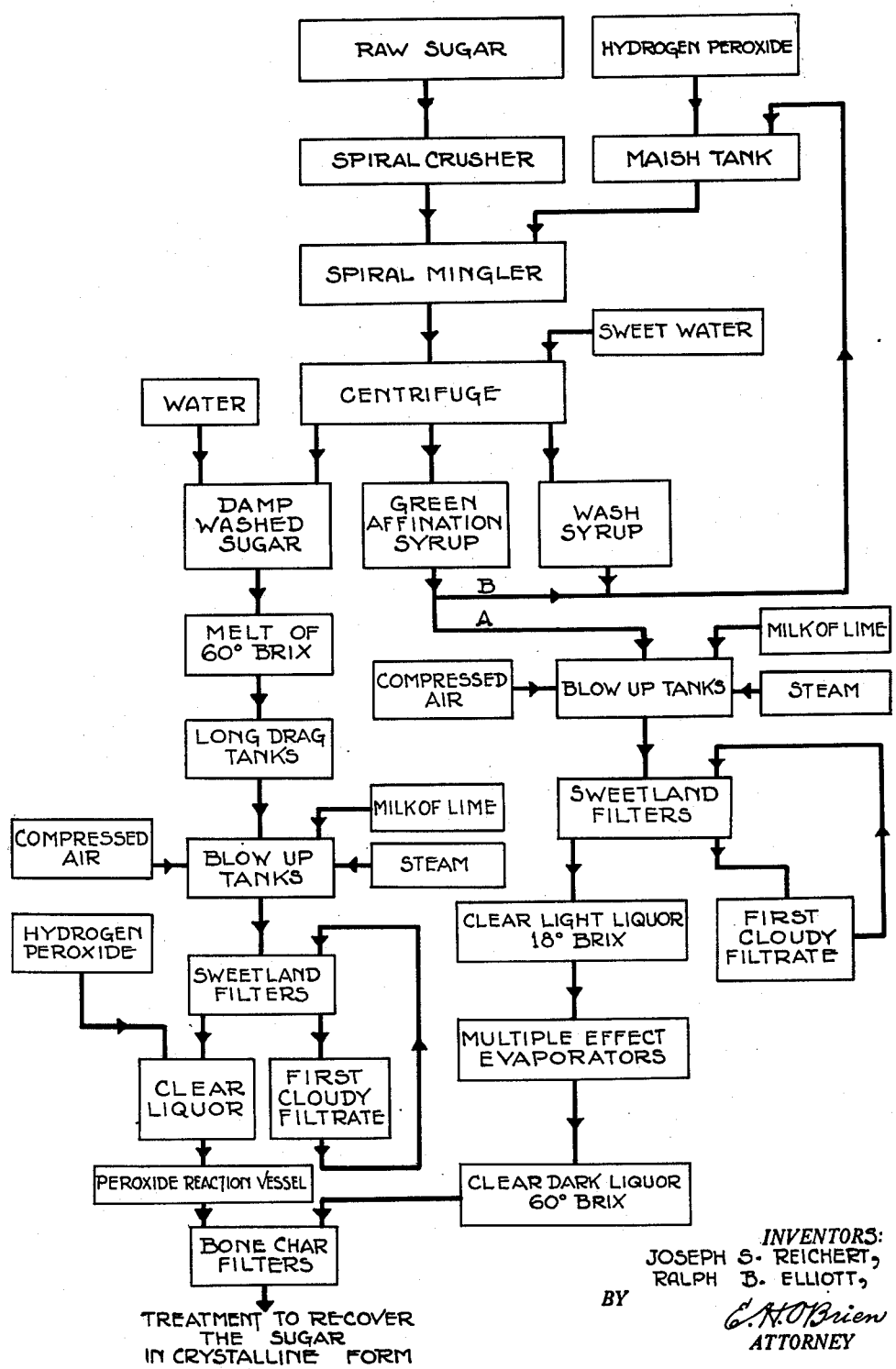

2,082,656

UNITED STATES PATENT OFFICE 2,082,656

PROCESS OF PURIFICATION OF SUGAR SOLUTIONS

Joseph S. Reichert and Ralph B. Elliott, Niagara Falls, N. Y., assignors to E. I. du Pont de Nemours & Company, Wilmington, Del., a corporation of Delaware Application July 11, 1935, Serial No. 30,884

9 Claims. (Cl. 127—64)

This application relates to the decolorization and clarification of sugar-containing liquors and syrups. More particularly, it relates to a process for preparing a decolorized, granulated cane sugar from raw sugars such as those of domestic origin, or from foreign sources as Cuba, Hawaii, Puerto Rico and the Philippines.

In the manufacture of white, granulated cane sugar it is usual to utilize as the starting product raw sugar which is obtained by evaporating to dryness the juice of the sugar cane. This raw product, which will hereinafter be termed "raw sugar", is frequently imported from various sources of supply outside of the United States such as Cuba, Puerto Rico, Hawaii and the Philippines. Usually it is shipped in large burlap bags, and in addition to the dark color resulting from the sugar juice itself it contains other dark colored impurities.

Ordinarily in the course of the refining operation the raw sugar is subjected to a number of treatments, and sugar-containing liquors or syrups are progressively subjected to a number of clarifying and decolorizing steps. At the conclusion of these steps the sugar liquor is ordinarily evaporated under reduced pressure until what is termed in the industry a "massecuite" results. This is customarily done in vacuum pans, and the granulated white product is recovered in this manner. In present day operations substantially all of the decolorizing is accomplished by subjecting the sugar syrups or liquors to the action of an alkali such as milk of lime and to the action of an adsorbent decolorizing medium such as bone char or activated carbon. The usual practice is first to treat the sugar liquor (prepared by dissolving the raw sugar in a suitable aqueous medium) in a process which will separate it into solid crystals and sugar syrups of various degrees of coloration. Each of these products is then subsequently treated to recover a refined product by subjection to the action of an alkali such as milk of lime and to the action of an adsorbent such as decolorizing carbon, thereby removing a large portion of the objectionable coloring matter and ashy impurities.

In practice it is essential that the sugar-containing solution being treated in order to remove the dark colored discoloring materials should be substantially neutral in reaction. In commercial refining it is usual to make a distinct effort to maintain the pH of the solution somewhere within the range 6.8 to 8.0. Ordinarily in the "blow up", or lime treatment step during which the sugar solution is agitated by means of compressed air and steam and subjected to the action of milk of lime, the pH tends to go up, the solution becoming somewhat alkaline in reaction. During this step in ordinary commercial practice the pH of the sugar solution may fall within the range 7.0 to 9.0. However, for reasons which will now be explained, it is essential that the solution shall not vary substantially from the condition of neutrality. Thus the pH should fall ordinarily within the range 6.8 to 7.5 and in no event should fall outside the range 6.0 to 9.0. Throughout this application this latter pH range will be spoken of as one of "substantial neutrality".

In the treatment of solutions containing sucrose, which is the principal sugar in the cane sugar of commerce, there is danger that inversion may occur. By "inversion" is meant the hydrolysis of a disaccharide sugar such as sucrose into a monosaccharide. Thus, cane sugar is converted by inversion to dextrose and levulose. Since the process is a hydrolysis reaction it is catalyzed by dilute acids and alkalies and by the action of enzymes. The action of hydrogen ions in catalyzing inversion is much more pronounced than the action of hydroxyl ions. Accordingly, if inversion is to be prevented or reduced to as large an extent as practicable, a pH below 7.0 is much more objectionable than one above 7.0. As a matter of fact, the pH of the sugar solution may go as high as 9.0 with little or no inversion occurring.

Although the conversion of sucrose or cane sugar into invert sugar always occurs to a certain extent whenever an aqueous sugar solution is permitted to stand for a period of time, it is an aim of the refining industry to reduce the amount of inversion to as great an extent as possible. This is partly because inversion is objectionable in that it involves a substantial change in the refined product from the condition in which it occurs in the natural food source, the sugar cane. However, the chief objection to a large amount of invert sugar is that it prevents crystallization. That part of the sugar which is present as invert sugar cannot be crystallized and therefore represents a substantial loss in the granulated sucrose yield. The uncrystallized syrupy solution remaining, which contains the invert sugar, can only be sold as refiners syrup, a product bringing a much lower price on the market than granulated cane sugar.

In the industry it is always desirable to prevent the formation of invert sugar to as great an extent as possible or in the language of the industry "to keep down the percentage of inverts". Because of the effect of hydrogen and hydroxyl ions in catalyzing inversion it is desirable that the pH of the sugar solution being treated be kept as close to 7.0, corresponding to exact neutrality, as is practicable. Ordinarily since the pH tends to drop during the latter stages of the process, it is necessary during the blowup or liming step that the pH be brought up to 8.5 to 9.0. In any event the industry has found that whenever the pH value of the sugar solution being treated falls outside of the range 6.0 to 9.0 inversion occurs to such an extent as to result in a product of diminished value. An essential characteristic of our improved process therefore is that it involves operation under conditions wherein the sugar solution is maintained substantially neutral in reaction.

As stated, in present day commercial sugar refining operations, the discoloring impurities are removed ordinarily by the action of an alkali such as milk of lime and by the action of an adsorbent such as bone char or activated carbon. In practice the sugar is treated with the milk of lime in a blow up tank wherein the temperature is elevated to one of about 185° F. and the solution agitated by means of compressed air and live steam. Heating coagulates some of the impurities and the main function of the lime is to regulate the pH of the sugar solution so that it does not fall outside the range 6.0 to 9.0. The alkali also functions to some extent to precipitate some of the constituents present in the sugar solution, particularly compounds of metal such as magnesium and iron. These precipitates are subsequently removed by filtration in Sweetland filter presses and the clear liquid is then treated with bone char or activated carbon, usually by filtering it again through bone char filters.

Ordinarily in present commercial practice the larger part of the color is removed in the char filters. These filters are used up after a number of hours of continuous service and must be replaced from time to time by new filters or must have their active material replaced or revivified. In commercial refineries which handle large amounts of raw sugar in twenty-four hour operation there are usually a large number of these charcoal filters and the replenishment of the active material in them is a substantial part of the cost of refining. Any process which would lengthen the life of the charcoal filters by removing some of the discoloring compounds and thus putting a lighter load on these filters, would be a distinct contribution to the industry. The process disclosed in this application utilizes an additional decolorizing and clarifying agent. This agent is introduced into the usual and customary process of commercial refining. One of the essentials for the successful use of our new decolorizing agent, hydrogen peroxide, is that the sugar solution which is treated with the solution of hydrogen peroxide utilized be substantially neutral in reaction (pH 6.0 to 9.0). This agent is ordinarily used in addition to the color removing materials now largely used, milk of lime and the bone char filters. It has been found that the use of hydrogen peroxide under the conditions characteristic of our improved clarification and decolorizing process, greatly prolongs the life of the bone char filters employed in commercial operation since the sugar solution in our process is ordinarily from 30 to 90% decolorized before it reaches these filters. Not only is there no tendency in our process for the percentage of inverts to increase but, surprisingly enough, it has been found that the use of hydrogen peroxide actually retards the occurrence of inversion to a substantial extent. Finally, the ash content is found to be lessened when our process utilizing a solution of hydrogen peroxide is employed and since the ash remains behind in the refiner's syrup obtained at the conclusion of the refining process, high ash content is a decided disadvantage. The higher the ash content the lower the recovery of crystallized sucrose, and this is an added reason for a lowered ash content.

Hydrogen peroxide is now sold in large volume in aqueous solutions of relatively high concentration. The usual commercial strength is "100 volume" hydrogen peroxide solution, which means that one volume of this solution will yield approximately 100 volumes of oxygen gas when the solution is at 20° C. and the evolved gas is measured at 0° C. and 760 mm. of mercury pressure. Such a solution contains about 27.6% by weight of hydrogen peroxide. Solutions of 100 volume peroxide, such as those sold commercially under the trade-marks "Albone C" and "Perone", prepared by an electrolytic process, are the solutions that we prefer to use in our process. The amounts subsequently specified are based on these commercial 100 volume solutions of hydrogen peroxide containing approximately 27.6% by weight of hydrogen peroxide. However, solutions of other strengths are frequently available, solutions of as high as 130 volume hydrogen peroxide having already been offered for sale. The usual dilute solutions sold in commerce are of lower volume concentrations, the 10, 17 and 25 volume solutions being usual. These solutions may also be used in our process but the amounts given below for 100 volume solutions should be proportioned in accordance with the volume concentration of the hydrogen peroxide solution employed. Thus, when the 25 volume concentration solution is used, the amount of the solution employed should be four times that which would be used were 100 volume used. The same considerations apply for solutions of lower and higher concentrations.

Solutions of hydrogen peroxide have already been suggested for use in the clarification of sugar juices but the method disclosed for decolorizing these products in the prior art have not been successful. Thus, suggestions for the use of oxygen evolving materials in the clarification of sugar juices go back as far at least as about 1860. Hydrogen peroxide has been variously suggested as the oxygen-evolving compound. In view of the fact that the literature contains references to the use of hydrogen peroxide in decolorizing sugar juices and syrups prior to 1900 it is significant that until the development of the process described in this application there was never any commercial use made of hydrogen peroxide for this purpose. The methods of the prior art have been generally unsatisfactory and hydrogen peroxide as a decolorizing agent had been dismissed by sugar chemists as a substance of very questionable and inferior utility in respect to its clarifying and decolorizing properties. The lack of use of this agent commercially is due to defects inherent in the prior art methods and the infirmities in these methods rendering them commercially valueless will be apparent from a comparison with the improved method forming the subject matter of this application.

Prior methods suggested for the use of oxygen evolving compounds generally and hydrogen peroxide specifically in the decolorizing of sugar syrups have generally been restricted to use in the clarification of sugar derived from beets. Generally the methods of the prior art have utilized hydrogen peroxide in one of the two following manners, either in conjunction with a catalytic material to set free the oxygen rapidly, such as bone char, charcoal or kieselguhr, or in conjunction with an acid treatment to destroy the coloring matters which are said to be ordinarily basic in character. In processes of the second class the real function of the hydrogen peroxide is to predispose the liquor being treated to ready and efficient purification subsequently by the action of acids and acidic substances.

Accordingly we have developed a process in which substantially all of the hydrogen peroxide is decomposed by the time the solution reaches the bone char or activated charcoal filters. We have found that it is not possible to dispense entirely with the step of treating the sugar liquors with bone char or activated carbon, operating with hydrogen peroxide alone, since many of the discoloring compounds can be removed much more efficiently and cheaply by the adsorbent action of bone char than by the action of hydrogen peroxide. Moreover, many discoloring substances probably are removable only by treating the sugar solution with an adsorbent. However, in our process in order that the hydrogen peroxide may be economically utilized and that maximum clarifying and decoloring results may be obtained for the amount of hydrogen peroxide employed, we so operate that substantially all of the hydrogen peroxide is decomposed before the sugar liquor is passed through the bone char filters. As an example, in our process we find that from 30 to 90% of the discoloring materials are destroyed by the hydrogen peroxide leaving from 10 to 70% of the discoloring agents to be removed by the adsorbent material. Since the load on the bone char filters is thus very much reduced we have found that the life of these filters in a plant operating in accordance with our method is increased almost 100% over the life of filters in plants where the entire clarification and decolorizing load is borne by the bone char. In one specific instance we have found that the life of one typical filter was extended from 50,000 to 90,000 gallons, the figure in each case representing the number of gallons of sugar containing liquor passed through the filter before the bone char need be replaced or revivified. Although while 30 to 90% of the discoloring ingredients are destroyed before the solution reaches the bone char filter when hydrogen peroxide is employed, operating in accordance with our process, the remaining 10 to 90% comprises those colored materials which are best removed in an economical and efficient way by the action of an adsorbent such as bone char.

It is important to bear in mind that the prior art thought rapid liberation of oxygen from hydrogen peroxide essential for satisfactory clarification. An elevated temperature was also considered necessary, the theory being that hydrogen peroxide being less stable at elevated temperatures would then decompose more rapidly. Surprisingly enough, after considerable experimentation, we have found that an elevated temperature is not desirable or necessary, and that excessive temperatures should, in general, be avoided except as necessitated by other process steps utilized in the complete refining method. We have also found that it is undesirable for the hydrogen peroxide solution to be decomposed rapidly and that far better decolorizing and clarifying action and far more economical utilization of the hydrogen peroxide are obtained when a prolonged period of treatment is adopted. We have therefore employed approximately a three hour treatment during which the sugar solution is subjected to the action of hydrogen peroxide in one phase of our process, and in another, hydrogen peroxide is present in the sugar liquor for the greater portion of about 16 minutes. Our discoveries, after careful investigation of the entire problem of decolorizing sugar syrups by the use of hydrogen peroxide in the refining of raw sugar, indicate that the prior art was completely in error when it regarded rapid liberation of oxygen as critical or desirable. On the contrary, we find that prolonged periods of contact between the sugar solution and the hydrogen peroxide and the absence of added agents, whether they be catalytic bodies such as bone char or other materials for the rapid liberation of oxygen, are to be carefully avoided. In this important respect our process differs completely from those already disclosed in the literature. At the same time since our process is intended for use in conjunction with a commercial refining method it is designed to operate at the temperature and within the time period usual and customary in commercial methods.

We may summarize the three important characteristics of our process as follows:—

1. The rapid liberation of oxygen from the solution of hydrogen peroxide utilized is avoided, and as long a period of contact between the hydrogen peroxide and the sugar liquor as is possible in conjunction with the particular refining process is to be obtained. Added agents for the rapid evolution of oxygen are not used and are to be avoided.

2. The process is to be carried out under conditions in which the sugar solution being treated is substantially neutral in reaction. As previously indicated this means that the pH of the solution should not vary appreciably from 7.0 and should preferably fall within the range 6.0 to 9.0. This is an essential and very necessary part of our process both for satisfactory decolorizing and clarifying with the hydrogen peroxide and for keeping down the percentage of invert sugars resulting. Whenever "substantial neutrality" or "substantially neutral" is referred to in this application a pH of 6.0 to 9.0 is intended.

3. Our process is further to be distinguished from those of the prior art in that it employs hydrogen peroxide and an adsorbent material such as bone char together in the clarification process, care being taken, however, to insure substantially complete decomposition of the hydrogen peroxide before the bone char filter is reached, thus avoiding any undue losses in hydrogen peroxide. While prior methods employed hydrogen peroxide in conjunction with various acidic compounds in the clarification process, we employ hydrogen peroxide without agents tending to facilitate its decomposition and, as a separate treatment step, an adsorbent such as bone char, or some other commercially valuable form of decolorizing carbon.

Having now specified the three important characteristics of our novel and improved method for the refining of raw sugar we will explain in detail how this method may be carried out on the commercial scale. In this explanation we will refer to the flow sheet annexed to the specification. This flow sheet illustrates part of a commercial process now widely employed in the refining of raw sugars. In describing our method it must be understood that it is not limited to operation in accordance with the precise procedure indicated diagrammatically on the flow sheet but is generally useful in all processes of sugar refining, it being understood, of course, that all such processes will be characterized by the three essential characteristics above discussed.

Taking the process illustrated on the flow sheet as illustrative, a raw cane sugar such as that obtained from domestic, Cuban, Puerto Rican, Philippine or Hawaiian sources is first crushed in a spiral crusher. The crushed raw cane sugar is then permitted to flow into a spiral mingler where a thick slurry or magma is prepared by thoroughly mixing the sugar with a liquid. As the liquid, "maish syrup" is commonly employed, which maish syrup is obtained in the continuous process as will subsequently be apparent. As is evident from the flow sheet the maish tank is connected with the spiral mingler.

To the maish tank a solution of hydrogen peroxide is added at intervals in amounts which will be subsequently specified. The flow sheet shows the hpdrogen peroxide addition and it is evident that hydrogen peroxide finds its way into the magma from the maish tank. If desired, the hydrogen peroxide solution may be added at any other point so that it finds its way into the maish tank as, for instance, to the affination syrup obtained from the centrifuge.

In practice the magma may be prepared by mixing 100 pounds of the raw sugar with about 45 pounds of saturated maish syrup. During the process the maish tank may be maintained at a relatively elevated temperature, such as one in the neighborhood of 150° F., so that the slurry in the mingler is at a temperature of about 110° F. At this elevated temperature the viscosity of the magma is reduced to such an extent that it is readily flowable.

The magma is then permitted to flow into the centrifuge. During the course of the operation, following the first centrifuging, the sides of the centrifuge are washed down with "sweet water". Sweet water is a solution obtained by washing the bone char taken from bone char filters which have become exhausted in use, prior to revivification or replacement of the active char.

During the centrifuging a relatively dark sugar liquor comes off first and is collected in the receptacle marked "Green affinition syrup". After removal of the green affination syrup the centrifuge ordinarily is brought into communication with a second receptacle for the "wash syrup", which is a relatively lighter colored liquor. Finally the solid product remaining in the centrifuge, "damp washed sugar", is discharged into a separate vehicle.

As shown, about one-seventh of the green affination syrup is permitted to flow through the line A to the blow up tanks. The remaining six-sevenths travels through the line B and is intermingled with the wash syrup and returned to the maish tank. This constitutes the maish liquor. Based on the sucrose present in the usual raw sugar being treated, ordinarily about 92% of the solid matter will be found in the damp washed sugar and but about 8% in the affination syrup. The term "affination syrup" includes the green affination syrup and the wash syrup.

It is significant that the greater portion of the hydrogen peroxide initially introduced into the maish tank remains in the affination syrup. Only that quantity of hydrogen peroxide is found in the damp washed sugar as is present in the liquor adhering to the sugar crystals. This constitutes but an extremely small portion of the hydrogen peroxide and can in all cases be disregarded. Most of the hydrogen peroxide remains in the affination syrup and a large portion thereof is returned to the maish tank with the wash syrup and about six-sevenths of the green affination syrup. The approximately one-seventh of the green affination syrup, which is diverted and permitted to flow to the blow up tanks, contains a substantial quantity of hydrogen peroxide (about one-seventh of the amount present in the magma) which amount will subsequently be specified in connection with the discussion as to the amounts of our active clarifying agent to use in the various phases of the process.

We will now direct our attention to the damp washed sugar. Water is added to this sugar in order to prepare the "washed sugar liquor", and this water may either be pure water or the previously mentioned sweet water. In commercial practice it is usual to use sweet water so that losses in power due to the necessity of concentrating the sweet water may be avoided to as large an extent as possible. In practice it is customary to make up a melt of washed sugar liquor having a gravity of about 60° Brix which means that it contains 60% sucrose. The Brix scale is based upon the percentage of sucrose in the sugar liquor being tested.

The washed sugar liquor is then fed into drag tanks where it is treated mechanically to remove impurities present therein such as scraps of cane, refuse of various sorts and pieces of bagging. But little attention need be paid to these drag tanks which may be of various forms. In one form a series of paddles on an endless conveyor is used to remove the foreign particles from the solution.

The washed sugar liquor is then fed to the blow up tanks. In these tanks milk of lime is added and the mixture thoroughly intermixed by the agency of compressed air and live steam. An elevated temperature, one in the neighborhood of 185° F. is utilized. Here the alkali treatment takes place and many of the inorganic impurities usually termed "ash" are converted to a state from which they may be removed by filtration. Although our process may sometimes operate without the blow up treatment with alkali we prefer to so operate, since this step also serves the important function of adjusting the pH of the sugar liquid to correspond with that of substantial neutrality. If omitted, an alkali treatment step of some sort must be used in most cases in order to adjust the pH of the sugar liquor. During this step the pH of the solution may be raised as high as 9.0 since during the latter portions of the process the pH may tend to drop somewhat.

From the blow up tanks the liquor is fed to a series of Sweetland filter presses where it is filtered under a pressure in the neighborhood of 50 pounds per square inch. In the process of filtration a cloudy filtrate is first obtained which is recycled as shown and sent through the Sweetland presses another time. In these filter presses kieselguhr is ordinarily added in order to render the filtering operation more efficient. A clear filtrate, which is optically clear but which still contains various discoloring compounds, is collected and subjected to further treatment. The pH of the solution at this time is determined, as it is throughout various other portions of the process, and if the plant is operating satisfactorily and the right quantity of milk of lime or other alkali is being utilized it falls within the specified range 6.0 to 9.0. The lime and kieselguhr cakes present in the Sweetland filters after the filtration are removed and subjected to various treatments which need not here be described, in order that the active materials may be reclaimed.

Hydrogen peroxide in amounts subsequently to be specified is now added to the clear liquor forming the filtrate. In commercial operations the clear liquor is usually pumped to a relatively high portion of the refinery where its temperature is about 165° F. Here it flows into the "Peroxide reaction tank" shown in the flow sheet. The hydrogen peroxide solution is decomposed in the sugar liquor during this part of the process and accomplishes the decolorizing. It is substantially completely decomposed during this step. The elevated temperature is not necessary for hydrogen peroxide decomposition but is characteristic of the sugar refining method used in large-scale refineries.

After substantially complete decomposition of hydrogen peroxide solution in the peroxide treatment tank, the solution is fed to the bone char filters. In the bone char filters the temperature at the start is usually about 145° F. but it rises to 165° to 175° F. during the filtration. This is due to an exothermic adsorption which occurs. It is significant that at the time the clear liquor reaches the bone char filters substantially all the hydrogen peroxide present therein is completely decomposed. Ordinarily in the process described about 16 minutes is required for the clear liquor to flow from the collecting tank below the Sweetland presses to the entry to the bone char filters. This includes the time the liquor is in the conduits and in the peroxide reaction tank. During this period decomposition of the hydrogen peroxide slowly occurs effecting the decolorization and clarification of the sugar juices. This is to be contrasted with the rapid oxygen evolution processes of the prior art in which almost immediate decomposition of the hydrogen peroxide was obtained either through the agency of catalysts for hydrogen peroxide decomposition such as bone char or by other methods. While a temperature of 165° F. is maintained in the peroxide reaction vessel this temperature is necessary in order that the solution may have a sufficiently reduced viscosity to permit flow to the bone char filter and also to result in better adsorption of colored bodies. However, an excessively high temperature is not necessary nor desirable in our process. Since our process is to be applied to commercial operations, conditions under which the hydrogen peroxide solutions function to decolorize must, however, conform to those prevalent in the commercial methods.

After passing through the bone char filters the solution is treated in various ways to recover the sugar in crystalline form. It may be noted that the bone char filters may also be fed by the sugar-containing liquor resulting from treatment of the affination syrup, which treatment will presently be described. The treatment to recover the sugar in crystalline form constitutes no part of our process and will not be described in detail. Ordinarily it consists of various concentrating, evaporating and centrifuging steps. The sugar is usually obtained as crystals in vacuum pans. The clarification and decolorization is complete after passage of the sugar containing liquor through the bone char filters and our improved process ends at that point. The crystalline products obtained as a result of our process are of superior whiteness and are very satisfactorily decolorized.

We will now return to the green affination syrup of which, it will be remembered, about one-seventh is diverted after the centrifuging to blow up tanks. These tanks are similar to those described in connection with the treatment of the damp washed sugar. Here again milk of lime is added to the green affination syrup and the mixture thoroughly agitated by compressed air and live steam. The quantity of milk of lime is determined in accordance with the kind of sugar being treated and the concentration of the liquor, in order that the pH should not vary substantially from that equivalent to neutrality. This means that the quantity used is sufficient to bring the pH within the range 6.0 to 9.0.

From the blow up tanks the treated green affination syrup flows through Sweetland filter presses. Here the syrup is filtered free of those precipitates resulting from treatment of the ashy substances with alkali in the blow up tanks. It is customary in the Sweetland filter presses, as described in connection with the other phase of our process, to operate with kieselguhr present as a filter aid. Ordinarily a pressure of about 50 pounds per square inch is usual in the Sweetland filter presses. After completion of the filtration the solid material, consisting chiefly of kieselguhr, lime and various inorganic precipitates, is removed and treated in order to recover the valuable ingredients. This treatment forms no part of our process and need not be described in detail.

As in the other portion of the process the liquid first flowing through the Sweetland filter presses is a cloudy solution and is returned for further filtration. The clear light liquor finally coming from the filters has a sucrose content equivalent to about 18° Brix. As shown, this is permitted to flow into multiple effect evaporators where it is concentrated sufficiently to increase its sucrose content to about 60° Brix. This liquor termed "clear dark liquor" also flows to the bone char filters and is treated simultaneously with or subsequently to the clear liquid obtained from the damp washed sugar phase of the process. Of course, in many refineries employing many char filters, the filters employed for the affination syrup may be different from those used in treating the washed sugar liquor.

As previously mentioned, about 92% of the solids originally present in the raw sugar are found in the damp washed sugar while about 8% are found in the green affination syrup. To clarify and decolorize this green affination syrup is more expensive than clarifying the damp washed sugar since it involves the use of larger amounts of all chemicals. For economical operation it is, of course, essential that this 8% be recovered. It is significant that while hydrogen peroxide solution is added to the clear liquor emerging from the Sweetland filter presses in the damp washed sugar portion of the treatment, no hydrogen peroxide is added during the course of steps constituting the green affination syrup treatment. This is because the affination syrup originally contains sufficient hydrogen peroxide while the damp washed sugar contains only an inconsequential amount resulting from that present in the liquor which adheres to the crystals.

The green affination syrup is obviously subjected to the action of hydrogen peroxide in the maish tank up to the time it flows into the clear dark liquor and collects at the outflow end of the multiple effect evaporators. This period of time amounts to about three hours in the process described thus illustrating the very slow character of our process for treating the green affination syrup with hydrogen peroxide. The hydrogen peroxide is slowly decomposed during this phase and is not rapidly decomposed as in the almost instantaneous oxygen evolution processes of the prior art. The temperature never exceeds about 150° F. during this portion of the process. The essential requirement in our process for economical operation of the char filters is that the clear dark liquor be entirely free of undecomposed hydrogen peroxide at the time it flows into the bone char filters. This is completely and entirely met by this described method of utilizing the hydrogen peroxide. Here again the use of elevated temperatures is avoided to as great an extent as consistent with commercial processes now in use. The only heating to which the green affination syrup is subjected is that moderate heating occurring in the blow up tanks and in the multiple effect evaporators. The use of a temperature closely approximating the boiling point, such as is characteristic of prior methods, is to be avoided if at all possible as undesirable in our decolorizing method.

The amount of 100 volume hydrogen peroxide solution added to the affination syrup (by introduction into the maish syrup or into some liquor so that it is carried to the maish syrup in the process) should vary from about 0.43 quart per 1000 lbs. of solid present in the affination syrup treated to about 2.86 quarts per 1000 lbs. of solids. We have found that approximately 1.43 quarts per 1000 lbs. of solids will ordinarily yield the best results. Since a quart of 100 volume hydrogen peroxide weighs approximately 2.3 lbs. and has a hydrogen peroxide concentration of about 27.6%, these amounts may be specified in pounds of hydrogen peroxide per 1000 lbs. of solids treated. Thus the amount of hydrogen peroxide ($H_2O_2$) added in the solution of hydrogen peroxide should vary from 0.27 lb. per 1000 lbs. of solids treated to about 1.77 lbs. per 1000 lbs. of solids treated and should preferably be about 0.89 lb. per 1000 lbs. of solids. These values apply to the affination syrup diverted to the blow up tanks and are based on the amount of affination syrup thus diverted. The hydrogen peroxide solution is, however, as previously specified, added directly to the maish syrup tanks.

With respect to the washed sugar liquor we have found that the amount of 100 volume hydrogen peroxide solution present for each 1000 lbs. of solids in the washed sugar liquor being treated should vary from about 0.12 quart to 0.30 quart. For best results we have ordinarily found that about 0.18 quart of 100 volume hydrogen peroxide solution per 1000 lbs. of solids in the washed sugar liquor being treated are desirable. These values may also be expressed in pounds of hydrogen peroxide per 1000 lbs. of solids, in the washed sugar liquor being treated. Thus, amounts ranging from 0.07 lb. to 0.19 lb. may be used, the best results being obtained when 0.11 lb. of hydrogen peroxide are added in the hydrogen peroxide solution, these amounts being per 1000 lbs. of solids in the sugar liquor being treated.

The amount of $H_2O_2$ to be added in the hydrogen peroxide solution may also be expressed on the basis of percentage, the hydrogen peroxide percentage being that amount of the peroxide present based on the weight of the solids in the sugar liquor being treated. Thus, in the affination syrup we have found amounts ranging from 0.027% to 0.177% of hydrogen peroxide to be desirable, the best results being obtained with approximately 0.089% present in the affination syrup diverted to the blow up tanks. We have found the percentage of hydrogen peroxide necessary in the washed sugar liquor to be somewhat less, ranging from 0.007% to 0.019%, the best results being obtained when there is approximately 0.011% hydrogen peroxide present. It is obvious that for most sugars the percentage of hydrogen peroxide necessary may be given with sufficient accuracy as about 0.09% in the green affination syrup and about 0.01% in the washed sugar liquor. Obviously about nine times as much hydrogen peroxide is necessary in the green affination syrup stage and this is primarily due to the fact that this liquor contains a much larger amount of dark colored impurities. These amounts are based on the quantity of solids in the affination syrup diverted to the blow up tanks and on the amount of solids in the washed sugar liquor fed to the peroxide reaction vessel.

Furthermore, we have found that the use of hydrogen peroxide under the conditions disclosed as characteristic of our improved process destroys to a very high degree those bacteria and ferments which are ordinarily present in sugar liquors and which are objectionable in the finished product whether it be in the completely refined crystalline sugar or in the refiner's syrup. These bacteria and ferments are those producing a sulfurous odor and those termed "flat sours" in the sugar industry. When present in refined sugar or refiner's syrup those of the first class tend to develop sulfur containing gases, particularly hydrogen sulfide, upon standing. This is particularly objectionable when the sugar is used in canning since the development of gases in an enclosed space causes bulging and breakage of the cans. The "flat sours" cause decomposition of the food product and the development of acidity. Our method completely eliminates these dangers, because it destroys these objectionable organisms.

It is to be understood that the various procedures herein disclosed are to be considered as illustrative and not restrictive. Various changes might be made in the precise steps herein outlined without departing from the spirit of our invention. The refining process outlined in the flow sheet is but a typical one and many changes might be made therein which would fairly come within the scope of our invention.

We claim:

1. A process for decolorizing a liquor containing cane sugar which comprises the steps of rendering said liquor substantially neutral in reaction by subjecting said liquor to the action of an alkali at a temperature in excess of room temperature but below the boiling point of said sugar containing liquor, subjecting said liquor to the action of hydrogen peroxide under conditions such that rapid decomposition of the hydrogen peroxide is substantially completely avoided, added catalysts for the decomposition of hydrogen peroxide being substantially absent during said treatment, permitting said liquor to stand until the hydrogen peroxide therein has been substantially completely decomposed, and subsequently passing said liquor through an adsorbent filter, said sugar-containing liquid being maintained substantially neutral during the entire process.

2. A process for decolorizing a liquor containing cane sugar which comprises the steps of rendering said liquor substantially neutral in reaction by subjecting it to the action of milk of lime at a temperature in excess of room temperature but below the boiling point of said sugar containing liquor, subjecting said liquor to the action of hydrogen peroxide under conditions such that catalysts for the rapid decomposition of hydrogen peroxide are substantially completely absent, permitting said sugar-containing liquor to stand until the hydrogen peroxide therein is substantially completely decomposed, and subsequently passing said sugar-containing liquor through a bone char filter, said liquor being maintained substantially neutral in reaction throughout the entire process.

3. A process for decolorizing a liquor containing cane sugar which comprises the steps of treating said liquor with lime at a temperature in the neighborhood of 185° F. in order to render it substantially neutral in reaction, and subjecting said substantially neutral liquor to the action of hydrogen peroxide under conditions such that rapid decomposition of said hydrogen peroxide is avoided, added catalysts for the decomposition of hydrogen peroxide being substantially absent during said treatment.

4. A method of decolorizing a liquor containing cane sugar which comprises the steps of subjecting said liquor to the action of hydrogen peroxide under conditions such that rapid decomposition of said hydrogen peroxide is substantially completely avoided, added catalysts for the decomposition of hydrogen peroxide being substantially absent during said treatment, and then subjecting said liquor to the action of an adsorbent decolorizing medium, said liquor being substantially free of undecomposed hydrogen peroxide during said latter step and also being substantially neutral in reaction throughout the entire process.

5. A method of refining raw cane sugar which comprises the steps of admixing an aqueous liquid containing hydrogen peroxide with said raw sugar in order to form a magma, subjecting said magma to centrifugation in order to separate crystals of damp washed sugar from the remaining affination syrup, adding water to said damp washed sugar crystals in order to prepare a sugar-containing liquor, subjecting said sugar-containing liquor to the action of milk of lime in order to render it substantially neutral in reaction, filtering and adding hydrogen peroxide to said substantially neutral filtrate, added catalysts for the decomposition of hydrogen peroxide being substantially absent from said sugar-containing liquor, permitting said filtrate to stand until said hydrogen peroxide therein is substantially completely decomposed, passing said filtrate through a bone char filter in order to complete the clarification and decolorizing, subjecting a portion of said affination syrup to the action of milk of lime in order to render it substantially neutral in reaction, filtering said limed affination syrup in order to obtain a clear filtrate, concentrating said filtrate, said concentrated filtrate being substantially free of undecomposed hydrogen peroxide, passing said concentrated filtrate through a bone char filter in order to complete the clarification and decolorization, and treating said sugar-containing liquids separately in order to recover refined crystalline cane sugar.

6. A method of refining raw cane sugar which comprises the steps of admixing an aqueous liquid containing hydrogen peroxide with said raw sugar in order to form a magma, subjecting said magma to centrifugation in order to separate crystals of damp washed sugar from the remaining affination syrup, adding water to said damp washed sugar crystals in order to prepare a sugar containing liquor, subjecting said sugar containing liquor to the action of an alkali at a temperature in excess of room temperature but below the boiling point of said sugar containing liquor in order to render said liquor substantially neutral in reaction, filtering, adding hydrogen peroxide to said substantially neutral filtrate, added catalysts for the decomposition of hydrogen peroxide being substantially absent from said sugar-containing liquor, permitting said treated liquor to stand until the hydrogen peroxide therein is substantially completely decomposed, subjecting said neutral filtrate to the action of an adsorbent agent in order to complete the decolorization, and subsequently treating said filtrate in order to recover refined crystalline cane sugar.

7. A method of refining raw cane sugar which comprises the steps of admixing an aqueous liquid containing hydrogen peroxide with said raw sugar in order to form a magma, added catalysts for the decomposition of hydrogen peroxide being substantially absent both from said aqueous liquid and said raw sugar, subjecting said magma to centrifugation in order to separate the crystals of damp washed sugar from the remaining affination syrup which contains the major portion of the added hydrogen peroxide, returning a portion of said affination syrup to said aqueous liquid which is admixed with the raw cane sugar to form said magma, subjecting the remaining portion of said affination syrup to the action of an alkali at a temperature in excess of room temperature but below the boiling point of said sugar containing liquor in order to render it substantially neutral in reaction, filtering, concentrating said substantially neutral filtrate, said concentrated filtrate being substantially free from hydrogen peroxide, subjecting said concentrated filtrate to the action of an adsorbent agent in order to complete the decolorization, and subsequently treating said filtrate in order to recover refined crystalline cane sugar.

8. In a process of refining raw cane sugar the steps which comprise preparing a magma by the addition of an aqueous liquid to said raw cane sugar, separating said magma into solid sugar crystals and affination syrup, rendering said affination syrup substantially neutral in reaction, and subjecting said affination syrup to the action of hydrogen peroxide in the absence of added catalysts for the decomposition of hydrogen peroxide and under conditions such that rapid decomposition of said hydrogen peroxide is substantially completely avoided in order to decolorize said affination syrup.

9. In a process of refining raw cane sugar the steps which comprise adding an aqueous liquid to said raw cane sugar in order to form a magma, separating crystals of solid sugar from said magma, the greater portion of dark coloring matter remaining behind in the affination syrup, dissolving said washed sugar crystals in water in order to prepare a sugar-containing liquor, adjusting the pH of said liquor until said solution is substantially neutral in reaction, subjecting said sugar-containing liquor to the action of hydrogen peroxide in the absence of added catalysts for the decomposition of hydrogen peroxide and under conditions such that rapid decomposition thereof is substantially completely avoided and permitting said sugar-containing liquor to stand until said hydrogen peroxide is substantially completely decomposed, the liquor being decolorized during the standing process.

JOSEPH S. REICHERT.
RALPH B. ELLIOTT.